J. W. JEPSON.
FASTENING AND TAKE-UP DEVICE FOR ANTISKID CHAINS.
APPLICATION FILED MAR. 20, 1918.
1,330,591.
Patented Feb. 10, 1920.
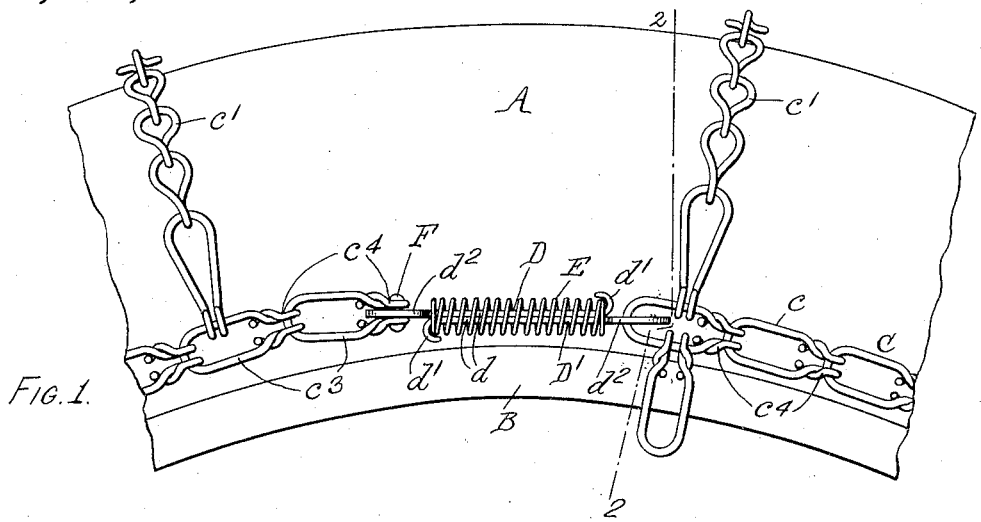
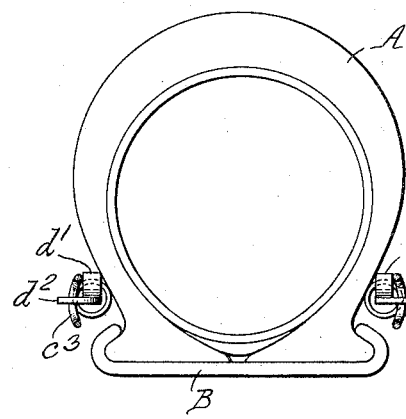
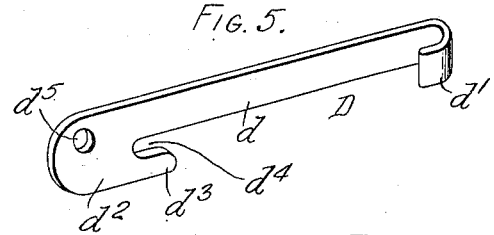
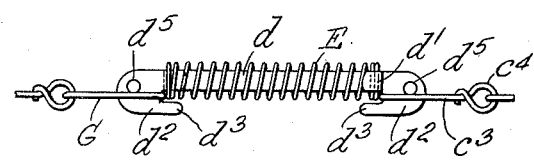
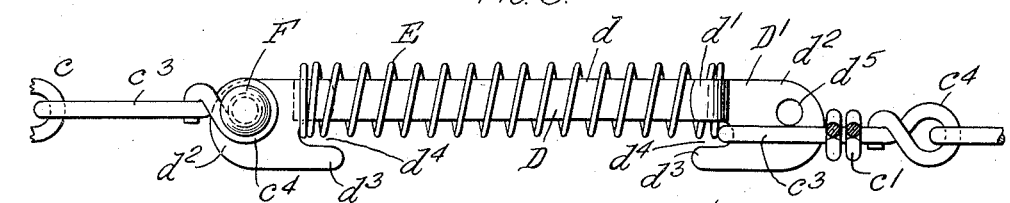
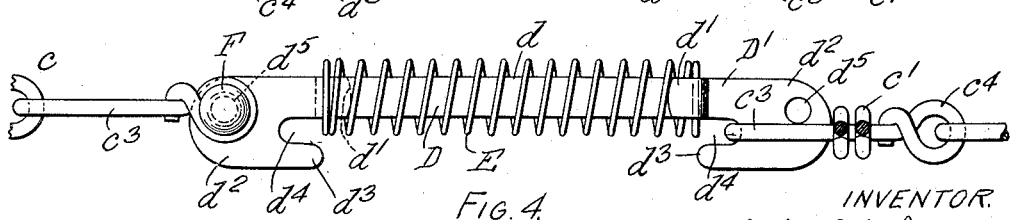
INVENTOR.
John W. Jepson,
By Wilhelm Parker,
ATTORNEYS.

UNITED STATES PATENT OFFICE.

JOHN W. JEPSON, OF BUFFALO, NEW YORK.

FASTENING AND TAKE-UP DEVICE FOR ANTISKID-CHAINS.

1,330,591. Specification of Letters Patent. Patented Feb. 10, 1920.

Application filed March 20, 1918. Serial No. 223,521.

*To all whom it may concern:*

Be it known that I, JOHN W. JEPSON, a citizen of the United States, residing at Buffalo, in the county of Erie and State of New York, have invented a new and useful Improvement in Fastening and Take-Up Devices for Antiskid-Chains, of which the following is a specification.

This invention relates more particularly to fastening and take up devices for connecting the ends of chains of the sort known as anti-skid chains which are applied to the tires of motor vehicles to prevent skidding.

These anti-skid chains are commonly composed of two side members or chains which extend circumferentially of the wheel at opposite sides of the tire near the rim, and are connected at intervals by short transverse chains or members which extend across the outside of the tire over the tread. The side members are furnished with end hooks or fastening devices for securing the chains on the tires. In applying such anti-skid chains to the wheels it is seldom that all of the component parts of the chains occupy their intended positions and much annoyance is experienced in properly adjusting the chains which are equipped with the usual sort of end hooks or fastening devices so as to fit fairly snugly on the tires, which is desirable in order to secure the best results in use. It is frequently difficult or impossible to engage the fastening hook or device in the proper link to obtain the desired fit and if the next link is used the chain is objectionably loose on the tire. The cross members or chains often hang down out of their true position when applying the anti-skid chains to the tires in such a way as to prevent the proper fitting of the chains to the tires and so as to produce slack in the side members after they have been in use a short time and adjust themselves to the tire, although the side members are drawn as taut as possible when applying the chains.

The usual hook fastening devices are only reliable when under tension, consequently when the above described slackness occurs they will become unfastened in use and the chains are lost.

Other fastening devices for this purpose are provided with snap hooks or the like, which make the devices more or less complicated, expensive and undesirable in use.

One object of this invention is to produce a desirable and practicable fastening and take-up device for the purpose stated, which is adapted to be readily and easily operated to connect the ends of an anti-skid chain in such a way that the chain can be fitted snugly to the wheel and that any slack of the chain which may occur will be taken up automatically. Another object is to produce a fastening device which will securely hold the ends of the chain in connection at all times, even though it is slack or becomes slack in use. Another object is to accomplish both the above results by the same means, thus reducing the number of parts and enabling the device to be easily and cheaply made and producing a device which will not readily become broken or worn out.

In the accompanying drawings:

Figure 1 is a fragmentary side elevation of a portion of a vehicle wheel and tire equipped with a non-skid chain provided with fastening devices embodying the invention.

Fig. 2 is a transverse section on line 2—2, Fig. 1.

Fig. 3 is an enlarged plan view of the fastening device with its parts in the positions occupied when the chain is slack.

Fig. 4 is a similar view showing the position of the parts when the chain is drawn taut and the fastening device is under tension.

Fig. 5 is a perspective view of one of the hook members of the device.

Fig. 6 is a plan view showing the device with a chain having a different kind of link at one end.

A is a tire and B the rim of a vehicle wheel on which a non-skid chain of a well known type is shown. This chain C consists of side members or chains $c$ which extend circumferentially of the wheel on opposite sides of the tire and cross chains or members $c'$ which are located at intervals around the tire and connect the side members. The side members shown, except in Fig. 6 are made up of a series of like links, each having a large loop $c^2$ and reduced eye portions $c^4$ at one end thereof connecting with the large loop of the next link.

The anti-skid chain may be of any other usual or desired form and constitutes no part of this invention.

Each fastening device for the ends of the side chains or members comprises a pair of hook members D D' arranged side by side and a connecting spring or retaining member. The two hook members are preferably alike and of the form shown in the drawings and are stamped from sheet metal. Each of these hook members includes a narrow flat shank portion $d$ one end of which is bent over and back parallel to the main portion of the shank to form a bearing shoulder or stop $d'$ for a purpose to be described later. At the opposite end the hook member is provided with a flat hook $d^2$ which has a beak $d^3$ extending toward the other end of the member, in the same plane as the shank $d$. This beak is spaced from the shank by a mouth or recess $d^4$. The hook is preferably provided with a hole $d^5$. The two hook members being alike, can be made from the same dies or tools.

The hook members D D' are arranged oppositely with their flat faces together and the hooks $d^2$ at the opposite ends of the device and extending toward each other and with the shoulders or stops $d'$ disposed on opposite sides of the device. Surrounding the shanks $d$ of the two hook members is a resilient expansible retainer E, preferably in the form of a coil spring. This retainer is confined between or bears at opposite ends against the oppositely disposed shoulders or stops $d'$ of the two hook members in such manner as to normally force the stops away from each other and draw the hooks $d^2$ toward each other or decrease the distance between the hooks.

When the form of chain shown in Figs. 1-4 is used one of the links at one end is connected by its eye portions $c^4$ to one of the hooks or heads $d^2$ of the hook members D D' by locating one eye portion on each side of the head in register with the hole $d^5$ in the hook and securing the link by a rivet F or otherwise. By grasping the retainer E and compressing it in the mouth of the hook having the rivet F, the hook at the opposite end of the device can be hooked into a link at the other end of the chain or the fastening device can be stretched sufficiently by pulling on the hook at its free end to enable the hook to be engaged with the required link of the chain to hold the chain taut on the tire.

If the chain is of such length that it is under tension when attached in the manner above stated, the device will remain in the position shown in Fig. 4 with the retainer somewhat compressed. The hook will then be securely retained in connection with the link by the tension exerted by the spring retainer E.

If, however, the chain slackens up in use, or should the chain be slack when applied, the retainer will expand and assume the position shown in Fig. 3 with one end extending into the mouth or recess $d^4$ of one of the hooks and the opposite end pressing against the end of the loop $c^3$ in the other recess and preventing the disengagement of the loop except by forcibly compressing the spring retainer.

In Fig. 6 is shown a chain having the usual loop $c^3$ at one end and a plain link G at the other. In this case the fastening device is not attached, as by the rivet F, and it is only necessary to engage both loops over the opposite hooks of the fastening device when the spring retainer will confine them both in the mouths of the hooks. The ends of the spring retainer and the mouths of the hooks are so proportioned and related that when the end of the retainer is positioned at the end of the beak of the hook or within the mouth of the hook, the link can not pass the end of the retainer and escape from the mouth.

The retainer E is made strong enough to prevent the disconnection of the chain while in use and provides a simple and inexpensive means of accomplishing the desired results.

I claim as my invention:

1. A connecting device for chains comprising two members arranged side by side and movable lengthwise relatively to each other, one of said members having at one end means for attachment to a chain and the other member having at the opposite end a hook for engagement with a chain link, and means surrounding the body portions of said members for yieldingly resisting relative movement of said members and coöperating with said hook to prevent the disengagement of said link therefrom.

2. A connecting device for chains comprising two members arranged side by side and movable lengthwise relatively to each other, one of said members having at one end and the other member having at the opposite end a hook for engagement with a chain link, and means surrounding the body portions of said members for yieldingly resisting relative movement of said members and coöperating with said hooks to prevent the disengagement of said links therefrom.

3. A connecting device for chains comprising two members held in operable relation to each other by a surrounding spring, said two members being movable side by side within said spring in opposite directions, said spring resisting the movement of said members to extend the device and forming means for retaining the end of the chain in connection with one of said members.

4. A connecting device for chains comprising two members, each having a shank or body portion, a hook at one end and a stop at the other end of said shank, said members being arranged side by side with their hooks at opposite ends of the device, expansible means surrounding said members between said hooks and said stops and adapted to coöperate with said hooks to retain portions of the chain in engagement with said hooks.

5. A connecting device for chains comprising two members each having one end of the chain attached thereto, and resilient means which permit said members to move in a direction to extend said device when said chain is in tension and prevent the ends of said chain from becoming detached from said device when the chain is slack.

6. A connecting device for chains comprising two members, one of which has means for attachment to a chain and the other of which has a hook for engagement with a link, a spring which connects said members and yieldingly resists the movement of said members to extend said device and coöperates with the mouth of said hook to prevent the disengagement of said link therefrom.

7. An extensible connecting device comprising two members each having a shank and a hook at one end, said members being arranged with their shanks parallel and their hooks facing inwardly at opposite ends of the device, and a spring surrounding said shanks between said hooks and acting to contract said device and yieldingly resist the extension thereof, the ends of said spring obstructing the mouths of said hooks so as to prevent disengagement of the hooks from the connected devices.

Witness my hand, this 18th day of March, 1918.

JOHN W. JEPSON.

Witnesses:
M. J. PITMAN,
C. W. PARKER.